Jan. 17, 1950
H. W. GROTE
2,494,614
PROCESS AND APPARATUS FOR FLUIDIZED
CATALYST REGENERATION
Filed Nov. 28, 1947
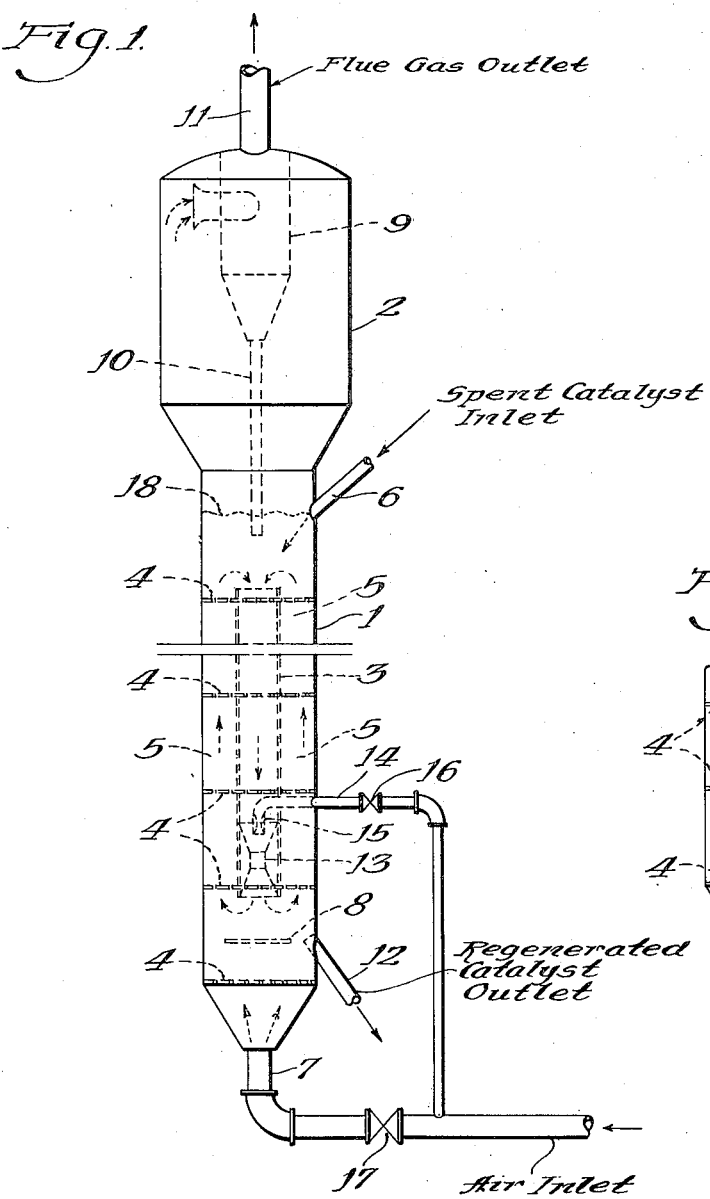
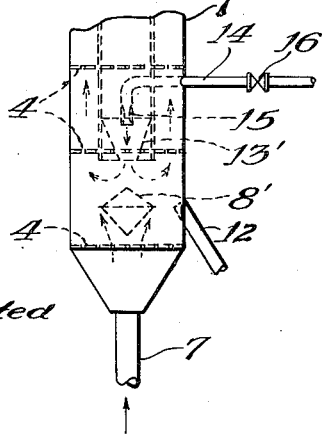
Inventor:
By: Henry W. Grote
Maynard P. Venema
Attorney
Philip J. Liggett
Agent Patented Jan. 17, 1950

2,494,614

UNITED STATES PATENT OFFICE 2,494,614

PROCESS AND APPARATUS FOR FLUIDIZED CATALYST REGENERATION

Henry W. Grote, Downers Grove, Ill., assignor to Universal Oil Products Company, Chicago, Ill., a corporation of Delaware Application November 28, 1947, Serial No. 788,637

6 Claims. (Cl. 252—417)

This invention relates to improved means for regenerating finely divided catalyst particles in a fluidized operation, or more specifically to improved means for contacting and recycling catalyst particles within a regenerating zone, in order to provide a more uniform temperature throughout the height of the fluidized bed, and a resulting improved rate of catalyst reactivation.

In carrying out the now well known fluidized type of operation, such as used for the catalytic cracking of petroleum or other related hydrocarbon conversion processes, a finely divided catalyst is employed to contact a reactant stream. The catalyst is maintained in a state of fluidization with a vaporized charge stream serving to hold the particles in an agitated state of hindered settling within a confined reaction zone. The used or spent catalyst is withdrawn from the reaction zone and passed to a regenerating zone and therein contacted with air or other oxygen containing stream, to effect the removal of carbonaceous contaminating matter so that the catalyst particles may be reused in the reaction zone. In a manner similar to the operation within the reaction zone, the oxygen containing stream serves to agitate and hold the particles in a condition of hindered settling during the burning and reactivation operation within the regenerating zone. The process is usually carried out in a continuous manner, regenerated catalyst being charged to the reaction zone and contaminated catalyst being continuously passed from the reaction zone to the regeneration zone.

As is known to those familiar with the art, the catalyst regenerating operation is of considerable importance since the rapid and adequate removal of the contaminating matter on the catalyst is necessary to provide a rapid and high degree of conversion within the reaction zone. Therefore, catalyst regenerating methods and apparatus have been subjected to considerable study and investigation in order to effect improvements.

The regenerating apparatus of this invention is of a type having an elongated vertically positioned chamber, an open-ended internal conduit positioned in the lower portion of the chamber, spaced flow restricting plates positioned between the wall of the conduit and the wall of the chamber and forming thereby a series of superimposed contacting sections, inlet means for charging catalyst particles to the chamber and particle outlet means for removing reactivated particles therefrom, regenerating gas inlet means at the lower end of the chamber suitable to contact the catalyst particles and transport them to the top of the internal conduit for downward recirculation, and particle separating and gas outlet means at the upper end of the chamber suitable to remove combustion gases therefrom substantially free of catalyst particles, with the improvement comprising, jet pumping means within the lower end of the internal conduit, means for introducing a major portion of the reactivating gas to the lower gas inlet, and means for connecting to and introducing a regulated minor portion of the reactivating gas to the jet pumping means at the lower end of the internal recirculation conduit.

In a more specific embodiment of this invention, a Venturi or cone type of eductor or ejector is used at the lower end of the internal conduit which is in turn centrally disposed in the regenerating chamber, with conduit and nozzle means employed in conjunction with the ejector to transfer a part of the regenerating medium thereto and thus forcibly move the descending material in the conduit downwardly and outwardly in a rapid positively controlled manner. The major portion of the air or regenerating gas enters the lower end of the unit, while baffling, or other like means, is arranged therein to aid in reversing the direction of flow of the solid catalyst particles and cause them to be carried up through the series of superimposed contacting beds being maintained in the regeneration zone. An inlet gas stream of flue gas, steam, nitrogen or the like may be used in the ejector to provide the desired fluid energy, however, in accordance with this invention, a regulated and controlled minor portion of the regenerating gas is preferably charged to the ejector as the pumping medium.

The general arrangement and design of this regenerator is such as to permit a very desirable and uniform regenerating operation. The perforated pressure reducing plates between the superimposed contacting zones serve to provide a series of superimposed fluidized, and relatively small, dense phase beds. The internal conduit provides means for recycling catalyst particles within the unit and effecting a more uniform temperature gradient throughout the entire height of the regeneration zone, as well as a more uniform contacting of the particles due to the series flow, while still maintaining a varying oxygen gradient from bottom to top of the entire regeneration zone.

A downward flow through the recycling conduit permits a dense phase gravity movement therein, within a zone where mixing is not particularly required since in this operation mixing and contacting is primarily accomplished in the outer superimposed contact bed. However, the use of an ejector type of pumping means, as provided by this invention, provides a particularly advantageous improvement to the operation of this type of unit in that a positively controlled and definite cyclic flow is attained. Further, an ejector provides an apparatus which is easily position in the unit, and is of particular advantage when compared with mechanically operated or moving types of apparatus which are difficult to mount and maintain within a pressure-tight regenerating chamber, that is also subject to being operated at high temperatures. An eductor may be placed in the lower end of the internal conduit to work with the normal gravity flow of the recycled particle stream so that it requires a minimum of pumping force to provide the desired operation. Also, as noted hereinabove, a portion of the reactivating stream is, in this invention, utilized to provide the pumping stream where normally the entire stream is introduced at the lower end of the regenerator. The quantity and rate of introduction may be readily controlled by valves, which may be regulated manually or by automatic flow controlling means.

Additional features and advantages of this improved means for carrying out catalyst regeneration will be apparent upon reference to the accompanying drawing and to the following description thereof.

Figure 1 is a diagrammatic elevational view of the improved regenerating unit.

Figure 2 is a partial elevational view of the lower portion of the unit, illustrating an alternate type of eductor in the lower end of the internal recirculation conduit.

Referring now to Figure 1 of the drawing, which indicates one embodiment of the improved regenerator with an internal conduit for recycling catalyst material, and eductor means in the lower end thereof to control the rate of circulation through the unit, the elongated and vertically positioned regenerating chamber 1 has an enlarged upper section 2, and suitable end closures or heads which provide a pressuretight contacting zone. In the lower portion of the chamber is an elongated vertically positioned conduit 3, which in this embodiment, is an open-ended cylindrical member placed concentrically in the center of the regeneration chamber. There is thus provided an annular shaped contacting space between the outer wall of the member 3 and the inner wall of the chamber 1. Placed horizontally across the annular space, at vertically spaced distances, are a plurality of perforated plates or grids 4 which divide the space into a series of superimposed contacting zones 5. The plates 4 are designed to restrict the fluidized flow of material and to cause a pressure drop from zone to zone, so that a series of separate fluidized beds of catalyst is maintained throughout the height of the regeneration section, and so that the particles will flow in an upward direction only, from one zone to another.

Spent catalyst is preferably introduced to the upper portion of the regenerating chamber through an inlet nozzle or conduit 6 at a point above the upper grid 4 and the upper end of the conduit 3. Thus, the catalyst particles are introduced into the chamber above the downcomer pipe or conduit 3 and into a zone of relatively low oxygen content, whereby a certain amount of occluded gaseous and vaporous material, transferred to the regenerating chamber with the particles, can be distilled off prior to the burning operation which takes place in the lower contacting zones of the regenerator where there is a higher oxygen content.

The air or oxygen stream which is supplied to the regenerator to provide the major portion of the reactivating gas for burning the carbonaceous material from the catalyst and to transport the catalyst upwardly through the various contacting zones 5, is introduced through an inlet line 7 at the lower end of the chamber 1. A baffle plate 8 is placed above the air inlet 7 and below the lower end of the internal conduit 3 in order to provide means for deflecting the upwardly moving air stream and the downwardly moving recycle stream through conduit 3, so that the solid catalyst particles may be carried upwardly through the superimposed contacting and regenerating zones 5 in the annular space.

At the upper end of the regenerating chamber, within the enlarged settling portion of the unit 2, is a catalyst separator 9, which may be of the cyclone or centrifugal type, suitable for removing entrained catalyst particles from the flue gas stream and for returning them to the lower portion of the unit through a dip pipe 10, while permitting the flue gas stream, substantially free of the particles, to be discharged through an outlet 11 at the top of the unit. Normally, the operation should be such that the catalyst is maintained in dense fluidized phase only within the lower portion of the chamber 1 and there exists within the upper section 2 a gaseous phase having only a small amount of catalyst entrained therewith. The enlarged cross-sectional area portion of the chamber 2 is desirable to cause the settling out of a large proportion of a solid material of catalyst and thereby reduce the loading on the separating means 9.

A regenerated catalyst outlet line 12 connects with the lower portion of the chamber 1, and in this embodiment, communicates with the zone below the lower end of the conduit 3. In the lower end of the recycling conduit 3 is a Venturi type of eductor 13, and communicating therewith, at its upper end, is a pumping fluid inlet line 14 with a nozzle 15 attached at its inner end which is arranged to discharge downwardly into the Venturi passage of the eductor 13. In the preferred arrangement as shown, the line 14 connects with line 7 and has a control valve 16 which is suitable for regulating the amount of gaseous medium to be charged through the line 14 to the eductor to provide the jet pumping medium. A control valve 17 is also placed in line 7 in order to provide adequate means for regulating the principal reactivation and fluidizing stream.

In operating this improved apparatus and means for regenerating catalyst in a more efficient and desired manner, the unit is operated in a continuous manner, with spent catalyst being charged to the top of the contacting section through line 6 and regenerating catalyst being continuously withdrawn from the lower zone by way of withdrawal line 12, while a regenerating gas stream is continuously charged to the unit through lines 7 and 14, and resulting combustion gases are removed through the upper outlet 11. The dense fluidized catalyst phase is normally maintained within the lower portion of the unit to a height which extends somewhat above the upper end of the conduit 3, as indicated by the irregular broken line 18. The cyclic flow of the catalyst is upward in a fluidized rapidly moving stream through the various superimposed contacting zones 5, and downward through the inner conduit 3, with the catalyst being maintained therein in a relatively compact dense phase column which can be moved downwardly out of contact with the outer stream, but in a heat exchange relationship therewith. The Venturi eductor 13 serves to move the material rapidly downwardly and outwardly from the conduit 3, so that the gravity flow is not depended upon to control the rate of catalyst circulation within the unit.

One of the advantageous features of this improved method of maintaining the cyclic flow within the regenerator, is the fact that this cyclic flow may be controlled by the quantity and velocity of the flow of the gaseous medium being charged to the eductor through the line 14.

In Figure 2 of the drawing, there is shown a portion of the lower end of the regenerator chamber 1 with a somewhat different form of eductor apparatus 13' and a cone-shaped baffle 8'. In this embodiment of the unit, the divergent cone portion of the Venturi shaped throat of the eductor is eliminated, however, the nozzle 15 is placed at the entrance of the converging conical section, as in Figure 1, and the jet pumping stream passing therethrough serves to eject the descending column of particles from the lower end of the conduit at a rapid controlled rate. The baffle 8' of this modification is formed as a double-ended cone which is desirable to provide a splitting and reversal of the flow stream and a resulting cyclic flow within the regenerator. As in Figure 1 of the drawing, a portion of the reactivation gas stream from line 7 may be passed through the jet pumping line 14 to the ejector means 13.

In a preferred operation, a minor portion of the air or oxygen stream, either of which may be used for reactivating the catalytic material in hydrocarbon conversion processes, is charged to the unit through the line 14, while the major portion of the air is charged to the lower end of the unit through line 7. The velocities of each of the streams may be regulated by means of the valves 16 and 17 to provide a substantially rapid rate of internal circulation and recycle of catalyst particles. The rapid recirculation rate provides a relatively uniform temperature throughout the contacting section from the bottom to the top thereof, while at the same time an oxygen gradient is maintained, which effects a high oxygen content at the lower end of the column, with a considerable amount of burning possible therein, and a very low oxygen content at the upper end of the contacting zone 5, so that little or no burning takes place in the latter. However, the hot combustion gases and hot partially reactivated catalytic material in the upper of the contacting zones can effect a stripping and distilling operation on the spent catalyst, which is charged to the upper zone through inlet 6.

It is advantageous in a regenerating zone to maintain an oxygen gradient, not only to effect the distillation operation, but to prevent the possibility of "after-burning" which is the burning of combustible gases in the upper light phase zone of the regenerator, and which may occur when there is an excess of oxygen present in the flue gas stream.

The controlled recycle flow, which effects a substantially uniform temperature in the regenerator, permits the burning of the carbonaceous material and the operation of the unit, as a whole, at a higher average temperature. In other words, where there is a considerable temperature gradient, the regeneration operation must be limited by the temperature in the zone having the highest temperature so that the catalyst material is not damaged by an excessive heat, with the result that the overall average temperature of the entire series of contacting zones may be relatively low. With the positively controlled and increased rate of circulation of this invention and the resulting more uniform temperature throughout the plurality of contacting zones, the temperature differential between the highest temperature zone and the lowest temperature zone will be relatively small and the operation can be carried out to maintain a higher overall temperature average, than under the aforesaid reactivation conditions having the greater temperature differential. The higher temperature average of course can effect a more rapid removal of the coke from the catalyst.

The particular eductor devices shown in the drawing and described hereinabove are diagrammatic only and it is not intended to limit the invention to the exact construction and arrangements shown. There are various types of ejectors or jet pumping means which are available or which may be designed to fit into a relatively large conduit such as may be necessary in a commercial unit of this type. It is also contemplated that means may be provided for easily removing the eductor unit from the lower end of the conduit, in order that repairs or replacements may be readily made, however, one of the principal advantages of a jet pumping unit of this type is the fact that it can be operated with little or no mechanical difficulties and will require less servicing than the usual types of pumps or rotating blade mechanical apparatus.

I claim as my invention:

1. In the regeneration of finely divided catalyst particles which have been contaminated with a carbonaceous deposit, the improved method of regeneration which comprises charging contaminated catalyst and a gaseous regenerating medium to a regenerating zone and maintaining therein fluidized beds of catalyst in a series of connecting and superimposed contacting zones, restricting the flow between said series of zones and maintaining successively lower pressures from the lowermost to the uppermost of said zones, supplying a portion of said regenerating medium in an upward direction to the lowermost of said zones, whereby said medium provides reactivation of said particles and the transfer of said catalyst in a fluidized condition successively upwardly through each of said superimposed zones, accumulating catalyst particles in an upper zone of said series and passing them in a relatively compact column downwardly therefrom to said lowermost zone, introducing a second portion of said regenerating medium in a downward direction to ejectment means at the lower end of said column and thereby forcibly ejecting said catalyst particles in a controlled manner to the lowermost zone of said series to maintain a continuous cyclic flow of catalyst upwardly through said series of contact zones, withdrawing regenerated catalyst from one of said contacting zones, and discharging resulting combustion gases from the upper portion of the regenerating zone.

2. The method of regenerating finely divided catalyst particles as described in claim 1, further characterized in that the first mentioned portion of regenerating medium comprises a regulated major portion of the medium, and the said second portion of the regenerating medium comprise a regulated minor portion whereby the rate of ejectment of the downwardly moving compact column of catalyst is controlled to maintain said continuous cyclic flow.

3. Apparatus for contacting finely divided solid particles which comprises in combination, an elongated vertically disposed chamber, an internal open-ended conduit disposed vertically within and spaced from the tap and bottom of the chamber, eductor means vertically positioned in the lower end of said conduit and having a restricted throat portion to forcibly eject material downwardly from said conduit, means for charging solid particles to the upper portion of said chamber and particle outlet means communicating with the lower portion thereof, a gas inlet at the lower end of said chamber, a second gas inlet directed downwardly into said eductor means, baffling means above said first mentioned gas inlet and below said conduit, and particle separating and gas outlet means at the upper end of said chamber.

4. Apparatus for contacting finely divided catalyst particles which comprises in combination, an elongated vertically positioned chamber, an internal conduit spaced concentrically within said chamber and forming thereby an annular shaped contacting space, the upper end of said conduit being open and spaced a substantial distance below the top of said chamber with the lower end of said conduit being spaced a relatively short distance from the bottom thereof, vertically spaced flow restricting plates positioned across said annular space between the chamber and conduit walls and forming thereby a series of superimposed contacting sections, a gas inlet at the lower end of said chamber, a Venturi-type of ejecting means vertically positioned in the lower end of said conduit and additional gas inlet means connecting therewith to pass a jet stream through said ejecting means and to control the downward flow of catalyst particles through said conduit, baffling means placed above first said gas inlet means and below said internal conduit, said baffling arranged to direct flow streams from said inlet and said ejecting means to said superimposed contacting sections within said annular space, particle inlet means connecting to said chamber above the top extremity of said internal conduit, particle outlet means from the lower of said contacting sections, and particle separating and gas outlet means at the upper end of said chamber for discharging gaseous and vaporous products therefrom substantially free of solid particles.

5. Apparatus for contacting finely divided catalyst particles which comprises in combination, an elongated vertically positioned chamber, an internal conduit spaced concentrically within said chamber and forming thereby an annular shaped contacting space, the upper end of said conduit being open and spaced a substantial distance below the top of said chamber with the lower end of said conduit being spaced a relatively short distance from the bottom thereof, vertically spaced flow restricting plates positioned across said annular space between the chamber and conduit walls and forming thereby a series of superimposed contacting sections, a regenerating gas inlet at the lower end of said chamber, a cone-shaped ejector positioned vertically within the lower end of said internal conduit and gas inlet means connecting therewith to pass a jet stream through said ejector and to control the downward flow of catalyst particles through said conduit, a double-ended cone-shaped baffle positioned above said regenerating gas inlet means and below said internal conduit, said baffle being vertically positioned and having one apex directed upwardly toward said internal conduit whereby to direct the recycled particles from said ejector to said contacting sections within said annular space, solid particle inlet means connecting to said chamber above the top extremity of said internal conduit, particle outlet means from the lower of said contacting sections, and particle separating and gas outlet means at the upper end of said chamber for discharging gaseous and vaporous products therefrom substantially free of solid particles.

6. The apparatus of claim 5 further characterized in that flow regulating means is provided at each of said gas inlets whereby the gas rates may be adjusted to control regeneration, and a conduit connects between said gas inlets whereby a portion of said regenerating gas introduced to the lower end of said chamber is conducted to said gas inlet at said ejector means.

HENRY W. GROTE.

REFERENCES CITED

The following references are of record in the file of this patent:

UNITED STATES PATENTS

| Number | Name | Date |
|---|---|---|
| 1,475,502 | Manning | Nov. 27, 1923 |
| 2,337,684 | Scheineman | Dec. 28, 1943 |
| 2,358,497 | Egloff | Sept. 19, 1944 |
| 2,416,730 | Arveson | Mar. 4, 1947 |
| 2,432,298 | Eastwood et al. | Dec. 9, 1947 |